United States Patent [19]
Kurek et al.

[11] Patent Number: 5,889,106
[45] Date of Patent: Mar. 30, 1999

[54] POLYISOCYANATES BLOCKED WITH 3,5-DIMETHYL-1,2,4-TRIAZOLE

[75] Inventors: Gerald Kurek; Eberhard König, both of Leverkusen; Klaus Nachtkamp, Düsseldorf; Theodor Engbert, Köln, all of Germany

[73] Assignee: Bayer Aktiengesellschaft, Leverkusen, Germany

[21] Appl. No.: 899,951

[22] Filed: Jul. 24, 1997

[30] Foreign Application Priority Data

Aug. 2, 1996 [DE] Germany .................. 196 31 269.8

[51] Int. Cl.$^6$ ................ C08J 3/00; C08K 3/20; C08L 75/00; C07D 249/08
[52] U.S. Cl. .................. 524/589; 524/590; 528/44; 528/45; 548/266.8
[58] Field of Search ................ 524/589, 590; 528/44, 45; 548/266.8

[56] References Cited

U.S. PATENT DOCUMENTS

| | | | |
|---|---|---|---|
| 3,721,645 | 3/1973 | Zemlin | 260/45.8 N |
| 4,482,721 | 11/1984 | Wegner et al. | 548/262 |
| 5,596,064 | 1/1997 | König et al. | 528/45 |

*Primary Examiner*—Patrick D. Niland
*Attorney, Agent, or Firm*—Joseph C. Gil; Thomas W. Roy; Diderico van Eyl

[57] ABSTRACT

This invention relates to polyisocyanates which are partially or completely blocked with 3,5-dimethyl-1,2,4-triazole, to heat curable, one-component coating compositions containing these blocked polyisocyanates and to the resulting coatings.

2 Claims, No Drawings

POLYISOCYANATES BLOCKED WITH 3,5-DIMETHYL-1,2,4-TRIAZOLE

BACKGROUND OF THE INVENTION

1. Field of the Invention

The present invention relates to new blocked polyisocyanates, to their use in one-component polyurethane coating compositions which can be stoved at comparatively low temperatures of 120° to 140° C. and which exhibit very low thermal yellowing, and to the resulting coatings.

2. Description of the Prior Art

Multi-layer coatings in which the top coat is a glossy clear coating based on blocked polyisocyanates and organic polyhydroxyl compounds, for example polyhydroxy polyacrylates, are becoming increasingly important, particularly for coating automobiles, due to their excellent properties.

Polyisocyanates which are suitable for this application i) have to be crosslinkable at a maximum stoving temperature of 140° C., ii) have to exhibit a degree of thermal yellowing during the stoving operation which is very slight or preferably does not occur at all, iii) have to have a viscosity as a concentrated organic solution which is sufficiently low for "high solid" applications, and iv) have to be based on inexpensive raw materials.

Polyisocyanates blocked with triazoles and pyrazoles are particularly suitable for stoving lacquers which exhibit a low degree of thermal yellowing. The polyisocyanates blocked with 1,2,4-triazole according to EP-A 0,004,571, which are particularly suitable as crosslinking agents for powder coating compositions, are essentially unsuitable for use in solvent-containing coating compositions because their solutions in organic solvents are relatively highly viscous and are often unstable due to the tendency of the blocked polyisocyanates to crystallize.

According to EP-A 0,682,051, this crystallization tendency can be suppressed by the use of a blocking agent mixture containing 1,2,4-triazole and 3,5-dimethylpyrazole; however, this mixed blocking procedure constitutes an additional production cost.

US-A 3,721,645 discloses 1,2,4-triazoles, including 3-ethyl-1,2,4-triazole amongst others, as stabilizing additives for polyurethane (PUR) melt-casting compositions. The production of polyisocyanates, in which the NCO groups are blocked with 3,5-dimethyl-1,2,4-triazole, is not disclosed.

An object of the present invention is to develop blocked polyisocyanates which satisfy the previously discussed requirements regarding low stoving temperatures, only slight thermal or no thermal yellowing, low viscosity in concentrated organic solutions, and the use of readily obtainable, inexpensive raw materials for their synthesis.

It has now surprisingly been found that these objectives may be achieved with the polyisocyanates according to the invention in which the isocyanate groups are blocked with 3,5-dimethyl-1,2,4-triazole.

SUMMARY OF THE INVENTION

The present invention relates to organic polyisocyanates which contain at least two isocyanate groups and have a total content of blocked and free isocyanate groups, (calculated as NCO, molecular weight=42 g) of 2 to 26% by weight, based on resin solids, wherein at least 95% of the isocyanate groups are present in blocked form and wherein at least 50% by weight of the blocking agent is 3,5-dimethyl-1,2,4-triazole.

The present invention also relates to heat curable, one-component coating compositions containing these blocked polyisocyanates and compounds containing at least two isocyanate-reactive groups and to the resulting coatings.

DETAILED DESCRIPTION OF THE INVENTION

The blocked organic polyisocyanates according to the present invention have a total content of blocked and free isocyanate groups (calculated as NCO, molecular weight=42 g) of 2 to 26% by weight, preferably 4 to 26% by weight, most preferably 8 to 20% by weight, based on resin solids.

The present invention also relates to a process for producing these polyisocyanates, optionally dissolved in lacquer solvents, by the reaction of a polyisocyanate component, which is optionally dissolved in lacquer solvents and which comprises at least one organic polyisocyanate and at least two isocyanate groups and which has an isocyanate content of 2 to 60% by weight, with a blocking agent at 50° to 120° C., wherein the blocking agent is used in a total amount of at least 95 equivalent percent with respect to the isocyanate groups of the polyisocyanate to be blocked, characterized in that 3,5-dimethyl-1,2,4-triazole is used as the blocking agent.

The blocked polyisocyanates are prepared by the reaction of a) a polyisocyanate component, which is optionally dissolved in lacquer solvents and contains at least one organic polyisocyanate having at least two isocyanate groups and an isocyanate content of 2 to 60% by weight with b) a blocking agent containing at least 50% by weight, based on the total weight of the blocking agent, of 3,5-dimethyl-1,2,4-triazole, at a temperature of 50° to 120° C., wherein equivalent ratio of blocking agents to isocyanate groups is at least 0.95:1.

Suitable polyisocyanates for preparing the blocked polyisocyanates according to the invention include known aromatic and (cyclo)aliphatic polyisocyanates which contain at least two isocyanate groups, preferably those which are commercially available. Examples include 2,4- and 2,6-toluene diisocyanate (TDI), 4,4'-diphenylmethane diisocyanate (MDI) and mixtures thereof with its isomers and/or higher homologs obtained by the phosgenation of aniline/formaldehyde condensates (crude MDI), xylylene diisocyanate (XDI), 1,4-butane diisocyanate (BDI), 1,6-hexane diisocyanate (HDI), 2,4- or 2,6-methylcyclohexyl diisocyanate ($H_6$TDI), isocyanato-3,3,5-trimethyl-5-isocyanatomethyl-cyclohexane (isophorone diisocyanate or IPDI), 4,4'-dicyclohexylmethane diisocyanate, and 3(4)-isocyanatomethyl-1-methylcyclohexyl diisocyanate (IMCI). NCO-prepolymers which are prepared from the preceding monomeric polyisocyanates and contain urethane groups and lacquer polyisocyanates which are prepared from the preceding monomeric polyisocyanates and contain one or more of biuret, allophanate, isocyanurate and/or uretdione groups. Also suitable are lacquer polyisocyanates, which are prepared from the preceding monomeric polyisocyanates and contain biuret, allophanate, isocyanurate and/or uretdione groups. Also suitable are lacquer polyisocyanates, which are prepared from 1,6-diisocyanatohexane, 1-isocyanato-3,3,5-trimethyl-5-isocyanatomethyl-cyclohexane and/or 4,4'-diisocyanato-dicyclohexylmethane and contain one or more of biuret, allophanate, isocyanurate and/or uretdione groups.

Preferred polyisocyanates are lacquer polyisocyanates, which contain (cyclo)aliphatically bound isocyanate groups, are prepared from 1,6-hexane diisocyanate, isophorone diisocyanate and 4,4'-dicyclohexyl-methane diisocyanate and contain biuret, isocyanurate, allophanate and/or uretdione groups. Especially preferred are lacquer polyisocyanates which are prepared from 1,6-hexane diisocyanate and contain isocyanurate, allophanate and/or biuret groups.

3,5-dimethyl-1,2,4-triazole, either on its own or in admixture with one or more other known reversible blocking agents having monofunctional reactivity towards isocyanate groups, is used as the blocking agent. The content of 3,5-dimethyl-1,2,4-triazole, based on the total weight of the blocking agents, is at least 50% by weight, preferably at least 80% by weight, and more preferably 100% by weight.

3,5-dimethyl-1,2,4-triazole is a colorless solid which crystallizes in the form of acicular crystals and has a molecular weight of 97.12 g (f.p. 144° C., b.p. 159° C./15 mbar). This compound can be prepared by known methods (Beilstein, Handbuch der Org. Chemie, E V, 26/1, page 267; Res. Discl. 1981, 360), e.g., by the reaction of 1 mole of hydrazine hydrate with at least 2 moles of acetamide at a temperature of 90° to 220° C.

When carrying out the process according to the invention, the blocking agent is used in an amount such that the equivalent ratio of isocyanate groups of the starting polyisocyanates to the blocking agent is 0.95:1 to 1.05:1. Accordingly, at least 95% of the isocyanate groups of the polyisocyanates are blocked, preferably they are completely blocked.

The process according to the invention is generally carried out at a temperature of 50° to 120° C., preferably 80° to 110° C. either in the absence or in the presence of suitable solvents, such as n-butyl acetate, methoxypropyl acetate, toluene, or higher aromatic solvent mixtures, e.g., the Solvesso solvents available from Exxon-Chemie.

In one embodiment of the process according to the invention the dissolved or pure polyisocyanate component is placed in a vessel together with the calculated amount of 3,5-dimethyl-1,2,4-triazole and with the amount of solvent needed to obtain the desired solids content, and this mixture is heated at 100° C. with stirring until the calculated NCO content is reached or, if complete blocking is desired, until the NCO content is less than 1%, preferably less than 0.2%. The mixture is optionally adjusted to the desired viscosity with further solvent.

The advantage of the crosslinking agents according to the invention for blocking lacquer polyisocyanates prepared from HDI is explained in more detail in Examples 1 and 4. When blocked with 1,2,4-triazole, these polyisocyanates without exception form highly viscous crosslinking agents which crystallize after a short time, and which cannot be used as storable one-component PUTR stoving lacquers. To the contrary lacquer polyisocyanates which are prepared from HDI and blocked with 3,5-dimethyl-1,2,4-triazole are storage stable and have a low viscosity.

The predominantly or completely blocked polyisocyanates according to the invention constitute valuable crosslinking resins for organic polyhydroxyl, polyamino and polyaminopolyhydoxyl compounds, preferably polyhydroxyl compounds, in one-component, heat curable coating compositions (stoving lacquers), preferably polyurethane coating compositions. They can be used instead of the blocked polyisocyanates which have previously been used for this purpose. Suitable polyhydroxyl compounds for use in these stoving lacquers and details relating to the production and application of stoving lacquers are known.

A particularly preferred area of application for the products according to the invention is their use as crosslinking agents for clear polyurethane stoving lacquers, such as those used as top coats, particularly for the multi-layer coating of automobiles. Suitable co-reactants for the blocked polyisocyanates include the known polyester polyols, polyacrylate polyols and mixtures thereof.

The invention is further illustrated but is not intended to be limited by the following examples in which all parts and percentages are by weight unless otherwise specified.

EXAMPLES

In the following examples, all percentages are given as percentages by weight unless indicated otherwise.

A comparison of Example 1 with Example 4 and a comparison of Example 2 with Example 5 demonstrate the superior resistance to crystallization and the lower viscosity, respectively, of polyisocyanates blocked with 3,5-dimethyl-1,2,4-triazole according to the invention compared to polyisocyanates blocked with 1,2,4-triazole.

A comparison of thermal yellowing, pendulum damping and solvent-resistance properties for coatings obtained from the clear coating compositions containing the blocked crosslinking agent from Comparison Example 3 and the crosslinking agent blocked according to the invention from Example 4 are described in Example 6. The blocked polyisocyanate of Comparison Examples was prepared with a mixture of blocking agent according to EP 0,682,051 (U.S. Pat. No. 5,596,064, herein incorporated by reference).

Example 1 (comparison example)

This example describes blocking a known lacquer polyisocyanate prepared from 1,6-diisocyanatohexane with 1,2,4-triazole. The product obtained was unusable in stoving lacquers because it crystallized.

Batch:

| | | |
|---|---|---|
| 200.0 g | (1.0 equiv.) | of a lacquer polyisocyanate containing isocyanurate groups and prepared from 1,6-diisocyanatohexane. NCO content: 21%; viscosity at 23° C. about 3000 mPa · s |
| 72.5 g | (1.05 mole) | 1,2,4-triazole |
| 117.0 g | | methoxypropyl acetate |
| 389.5 g | (1.0 equiv. of blocked NCO groups) | |

Experimental:

The lacquer polyisocyanate was dissolved in methoxypropyl acetate. The total amount of 1,2,4-triazole was then added to the stirred solution at room temperature. The mixture was gradually heated to 100° C., at which temperature the blocking agent went into solution. The solution was stirred at 100° C. for a further one hour. After the NCO bands (IR spectrum) disappeared, the mixture was allowed to cool. During this cooling step, the solution became turbid, and complete crystallization occurred after storage overnight.

Example 2 (comparison example)

This example describes blocking a known lacquer polyisocyanate prepared from IPDI with 1,2,4-triazole. The viscosity of the resulting blocked lacquer polyisocyanate was too high for high solid applications.

Batch:

| 350.0 g | (1.0 equiv.) | of a lacquer polyisocyanate containing isocyanurate groups, prepared from IPDI and present as a 70% solution in solvent naphtha 100. NCO content: 12%; viscosity at 23° C. about 150 mPa · s |
|---|---|---|
| 72.5 g | (1.05 mole) | 1,2,4-triazole |
| 65.0 g | | methoxypropyl acetate |
| 487.5 g | | (1.0 equiv. of blocked NCO groups). Calculated content of blocked NCO groups: 8.6%. Solids content: 65% |

Experimental:

The lacquer polyisocyanate and methoxypropyl acetate were placed in a vessel and stirred. 1,2,4-triazole, which was present in the form of white flakes, was gradually added thereto, and the mixture was heated to 100° C. with stirring. After a reaction time of about 6 hours, the content of NCO groups detectable by IR spectroscopy was very low. The mixture was allowed to cool, and a clear, pale yellow solution of the blocked polyisocyanate was obtained, which had a viscosity as a 65% solution of 60 000 mPa·s at 23° C.

Example 3 (comparison example)

This example describes the use of a mixture of blocking agents to block the lacquer polyisocyanate based on 1,6-diisocyanatohexane used in Example 1. However, as opposed to Example 1, a liquid blocked lacquer polyisocyanate was obtained which did not crystallize.

Batch:

| 400.0 g | (2.0 equiv.) | of a lacquer polyisocyanate containing isocyanurate groups and based on 1,6-diisocyanatohexane according to Example 1 |
|---|---|---|
| 69.0 g | (1.0 mole) | 1,2,4-triazole |
| 96.0 g | (1.0 mole) | 3,5-dimethylpyrazole |
| 242.0 g | | methoxypropyl acetate |
| 807.0 g | | (2.0 equiv. of blocked NCO groups). Solids content: 70% Calculated content of blocked NCO groups: 10.4%. |

Experimental:

The lacquer polyisocyanate and methoxypropyl acetate were placed in a vessel. Solid 1,2,4-triazole (white flakes) was added with stirring. The mixture was heated to 100° C., at which temperature 1,2,4-triazole went into solution. An NCO content of 5.5% (calculated: 5.9%) was measured after a reaction time of 30 minutes. The mixture was cooled to 70° C. and 3,5-dimethylpyrazole (colorless crystals) was added. After a reaction time of 30 minutes at 70° C., an NCO content could no longer be detected by IR spectroscopy. A clear, light yellow 70% solution was obtained, which had a viscosity of about 3000 mPa·s at 23° C. The dissolved, blocked polyisocyanate had a content of blocked NCO groups of 14.8% (calculated as NCO and based on resin solids). The properties of a clear coating prepared from this blocked lacquer polyisocyanate are set forth in Example 6.

Example 4 (according to the invention)

This example describes the preparation of a blocked polyisocyanate according to the invention from the lacquer polyisocyanate based on 1,6-diisocyanatohexane used in Example 1. However, as opposed to Example 1, a liquid blocked lacquer polyisocyanate was obtained which did not crystallize.

Batch:

| 200.0 g | (1.0 equiv.) | of a lacquer polyisocyanate containing isocyanurate groups and based on 1,6-diisocyanatohexane according to Example 1 |
|---|---|---|
| 101.9 g | (1.05 mole) | 3,5-dimethyl-1,2,4-triazole |
| 129.4 g | | methoxypropyl acetate |
| 431.3 g | | (1.0 equiv. of blocked NCO groups). Solids content: 70% Calculated content of blocked NCO groups: 9.7%. |

Experimental:

The lacquer polyisocyanate and methoxypropyl acetate were placed in a vessel. The solid 3,5-dimethyl-1,2,4-triazole was added with stirring. The mixture was heated to 110° C., at which temperature 3,5-dimethyl-1,2,4-triazole went into solution. Only a slight NCO content of less than 0.2% could still be measured after a reaction time of 8 hours at 110° C.

The mixture was allowed to cool to room temperature and stand overnight, at which time the reaction was complete (NCO groups were no longer detected by IR spectroscopy). A clear, pale yellow 70% solution was obtained, which had a viscosity of 3800 mPa·s at 23° C. The dissolved, blocked polyisocyanate had a content of blocked NCO groups (calculated as NCO) of 9.7%, based on solution, and 13.9% based on resin solids. The properties of a clear coating prepared from this blocked lacquer polyisocyanate are set forth in Example 6.

Example 5 (according to the invention)

This example describes the preparation of a blocked polyisocyanate according to the invention from the lacquer polyisocyanate based on IPDI used in Example 2. However, as opposed to Example 2, a liquid blocked lacquer polyisocyanate having a comparatively low viscosity was formed.

Batch:

| 355.0 g | (1.0 equiv.) | of a lacquer polyisocyanate containing isocyanurate groups and based on IPDI (70% solution) according to Example 2 |
|---|---|---|
| 101.9 g | (1.05 mole) | 3,5-dimethyl-1,2,4-triazole |
| 82.1 g | | methoxypropyl acetate |
| 539.0 g | | (1.0 equiv. of blocked NCO groups) |

Experimental:

The lacquer polyisocyanate solution and methoxypropyl acetate were placed in a vessel. The mixture was heated to 110° C., at which temperature 3,5-dimethyl-1,2,4-triazole went into solution. Only a slight NCO content of less than 0.2% could still be detected after a reaction time of 8 hours at 110° C.

The mixture was allowed to cool to room temperature and stand overnight at which time the reaction was complete (NCO groups were no longer detected by IR spectroscopy). A clear, pale yellow 65% solution was obtained, which had a viscosity of 26 000 mPa·s at 23° C. The dissolved, blocked polyisocyanate had a content of blocked NCO groups (calculated as NCO) of 7.8%, based on solution, and 12.0%, based on resin solids.

Comparison of viscosities:

Example 2 (comparison example): η=60 000 mPa·s/23° C.
Example 5 (according to the invention): η=26 000 mPa·s/ 23° C.

The viscosities were determined using a VT 181 rotating viscometer supplied by Haake Messtechnik GmbH & Co.

Example 6 (according to the invention)

Clear coating compositions are described containing a polyhydroxyl polyacrylate and either the blocked crosslinking agent from Comparison Example 3 and the blocked crosslinking agent according to the invention from Example 4. The properties of these coatings are also described.

Acrylate I was a 75% solution of a commercially available polyacrylate resin in xylene, having a hydroxyl group content, based on solution, of 4.7% (Desmophen A, test product LS 2051 supplied by Bayer AG, Leverkusen).

1. Synthesis of Clear Coating Compositions

The clear coating compositions were prepared by mixing the polyacrylate resin with the crosslinking agents from Examples 3 (clear lacquer A) and 4 (clear lacquer B) at an equivalent ratio of 1:1 and adding a catalyst as set forth below.

| Clear coating composition | Polyisocyanate | Polyol component | | Dibutyltin dilaurate catalyst |
|---|---|---|---|---|
| A | Example 3, 403 g | 363 g | acrylate I | 0.77 g (0.1%) |
| B | Example 4, 431.8 g | 363 g | acrylate I | 0.79 g (0.1%) |

2. Application, Thermal Yellowing, Pendulum Damping and Solvent-Resistance

The clear coating compositions were applied with a wet film thickness of about 120 to 150 μm to sheet metal test panels which had been coated with a commercially available white base coat (Permacron Mischlack Serie 293 MB 501 white, supplied by Spies & Hecker/Cologne).

The sheet metal test panels were subsequently stoved for 30 minutes at 140° C. in a drying oven. Thereafter, color was determined by the CIA-LAB method (DIN 6174). The greater the positive value of b, the more the clear coating has discolored.

This was followed by overfiring for 30 minutes at 160° C. A measurement was then made of the increase in yellowing, which according to the CEE-LAB system (DIN 6174) is termed the Δb value. This value should be as close to 0 as possible for clear lacquers which are resistant to overstoving.

The results obtained on clear coatings A and B are set forth below.

| Clear coating | Thermal yellowing after the stoving operation (b) | Thermal yellowing after the overstoving operation (Δb) | Coat thickness (μm) |
|---|---|---|---|
| A | 1.4 | 1.0 | 55 |
| B | 0.9 | 1.6 | 55 |

For coating B), the sum of the individual values b) and Δb) was 2.5. An analogous clear coating based on the same lacquer polyisocyanate blocked with butanone oxime resulted in a (b+Δb) value of 5.1 under identical test conditions.

With regard to pendulum damping and solvent-resistance, clear coating B (according to the invention) exhibited values which were superior to those of clear coating A (comparison) and superior to those of a another analogous clear coating based on a polyisocyanate blocked with butanone oxime.

Clear coating B (according to the invention): 3,5-dimethyl-1,2,4-triazole as the blocking agent Clear coating A (comparison): mixture 3,5-dimethyl pyrazole and 1,2,4-triazole as blocking agents Clear coating C (comparison): butanone oxime as the blocking agent

| Clear lacquer film | | B | | A | | C | |
|---|---|---|---|---|---|---|---|
| König pendulum hardness (oscillations) | | 143 | | 131 | | 111 | |
| Solvent-resistance* after a) 1 min b) 5 min | | a) | b) | a) | b) | a) | b) |
| | xylene | 0 | 0 | 1 | 2 | 2 | 3 |
| | methoxypropyl acetate | 0 | 1 | 2 | 3 | 2 | 3 |
| | ethyl acetate | 2 | 5 | 3 | 5 | 5 | 5 |
| | acetone | 5 | 5 | 5 | 5 | 5 | 5 |

*ratings: 0 (good) –5 (poor)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An organic polyisocyanate, that is not an NCO prepolymer containing urethane groups, which contains at least two isocyanate groups and has a total content of blocked and free isocyanate groups (calculated as NCO, molecular weight=42 g) of 2 to 26% by weight, based on resin solids, wherein at least 95% of the isocyanate groups are present in blocked form and wherein at least 50% by weight of the blocking agent is 3-5-dimethyl-1,2,4-triazole.

2. The organic polyisocyanate of claim 1, wherein the organic polyisocyanate is in an organic solvent and the polyisocyanate is not crystallized.

* * * * *